United States Patent
Thunström et al.

(10) Patent No.: US 10,936,063 B2
(45) Date of Patent: Mar. 2, 2021

(54) METHOD AND DEVICE FOR CALIBRATING AN EYE TRACKER

(71) Applicant: Tobii AB, Danderyd (SE)

(72) Inventors: Robin Thunström, Danderyd (SE); Tobias Höglund, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/681,030

(22) Filed: Nov. 12, 2019

(65) Prior Publication Data

US 2020/0192474 A1 Jun. 18, 2020

(51) Int. Cl.
*G06F 3/01* (2006.01)
*G06T 7/80* (2017.01)
*G06K 9/00* (2006.01)

(52) U.S. Cl.
CPC .......... *G06F 3/013* (2013.01); *G06K 9/00604* (2013.01); *G06T 7/80* (2017.01)

(58) Field of Classification Search
CPC ........ G06F 3/013; G06T 7/80; G06K 9/00604
USPC ....................................................... 345/156
See application file for complete search history.

(56) References Cited

U.S. PATENT DOCUMENTS

| | | | |
|---|---|---|---|
| 2016/0029883 A1* | 2/2016 | Cox .................... | G06K 9/00604 351/209 |
| 2016/0134863 A1* | 5/2016 | Horesh .............. | G06K 9/00604 348/78 |
| 2020/0050263 A1* | 2/2020 | Wu ........................ | G06F 17/17 |

\* cited by examiner

*Primary Examiner* — Mark Edwards
(74) *Attorney, Agent, or Firm* — Samuel I. Yamron

(57) ABSTRACT

Disclosed is a method for calibrating an eye-tracking device to suit a user of the eye-tracking device, wherein a calibration setting of the eye-tracking device—associated with a user is calculated based on acquired eye data of the user when looking at a set of reference points. The method comprises displaying a reference point of the set to the user; acquiring, by means of at least one camera of the eye-tracking device, eye data for at least one of the eyes of the user when looking at the reference point; comparing the acquired eye data to stored eye data sets related to the reference point, wherein each of the stored eye data sets is associated with a calibration setting of the eye-tracking device; and if the acquired eye data matches one of the stored eye data sets, abandoning the calibration process and loading the calibration setting associated with the matching stored eye data.

13 Claims, 5 Drawing Sheets

METHOD AND DEVICE FOR CALIBRATING AN EYE TRACKER

CROSS-REFERENCES TO RELATED APPLICATIONS

This application claims priority to Swedish Application No. 1851425-7, filed Nov. 15, 2018; the content of which are hereby incorporated by reference.

TECHNICAL FIELD

The present disclosure relates generally to methods, systems and devices for calibrating an eye-tracking device to suit an individual user.

BACKGROUND

Several different eye-tracking systems are known in the art. Such systems may, for example, be employed to allow a user to indicate a location at a computer display by looking at that point. The eye-tracking system may capture images of the user's face, and then employ image processing to extract key features from the user's face, such as a pupil center and glints from illuminators illuminating the user's face. The extracted features may then be employed to determine where at the display the user is looking.

For a user to have an accurate and precise eye-tracking experience the user needs to calibrate the eye tracker. This is typically done by looking at a given set of reference points for a certain amount of time and acquiring eye data of the user related to the gaze direction of the user. Once the set of reference points have been looked upon by the user a calibration profile is established, defining the characteristics of at least one of the person's eyes. This calibration profile may contain data on the characteristics of the user's eye(s), for instance, the interocular distance (IOD), inter-pupillary distance (IPD), pupil size, pupil size variations, bright pupil contrast, dark pupil contrast, corneal radius and the like. This information may be pre-existing in the calibration profile or may be incorporated into the calibration profile at the time of analysis. Alternatively, default parameters may be stored in the eye tracker to serve as an initial starting point.

The calibration process can be time-consuming and tedious. Reducing the amount of time spent in this process is key for a good eye-tracking experience. Consequently, there exists a need for improvement when it comes to facilitating calibration in eye-tracking devices.

SUMMARY

It is an object of the invention to address at least some of the problems and issues outlined above. An object of embodiments of the invention is to provide a device and a method which improves the eye-tracking experience for a user with respect to the calibration process. It may be possible to achieve these objects, and others, by using methods, devices and computer programs as defined in the attached independent claims.

According to a first aspect of the present invention, there is provided a method for calibrating an eye-tracking device to suit a user of the eye-tracking device, wherein a calibration setting of the eye-tracking device associated with a user is calculated based on acquired eye data of the user when looking at a set of reference points, the method comprising the steps of: displaying a reference point of the set to the user; acquiring, by means of at least one camera of the eye-tracking device, eye data for at least one of the eyes of the user when looking at the reference point; comparing the acquired eye data to stored eye data sets related to the reference point, wherein each of the stored eye data sets is associated with a calibration setting of the eye-tracking device; and if the acquired eye data matches one of the stored eye data sets, abandoning the calibration process and loading the calibration setting associated with the matching stored eye data.

By reducing the number of reference points displayed to the user and comparing the acquired eye data with stored eye data to obtain a match, the time needed for the calibration process is significantly reduced while achieving a viable calibration which suits the user to a high degree.

In a preferred embodiment, if the acquired eye data does not match any of the stored eye data sets, the method further comprises: repeating the steps of displaying reference points and acquiring eye data for the remaining reference points in the set; calculating a calibration setting based on the acquired eye data for all the reference points in the set; and storing the calculated calibration setting and the acquired eye data for all the reference points in the set. If no match is found, the calibration process continues in the conventional way wherein the calibration setting and associated eye data are stored for future use during subsequent calibration of the eye-tracking device to a user.

In a further preferred embodiment, a match is determined if the difference between the acquired eye data and the stored eye data does not exceed a predetermined threshold value. The threshold defines a limit for the comparison of the acquired and the stored eye data and ensures that a determined match provides a viable calibration for the user.

In an advantageous embodiment, the step of acquiring eye data comprises determining a gaze direction offset between a gaze direction of at least one of the eyes of the user and the reference point and the step of comparing eye data comprises comparing the acquired gaze direction offset with stored gaze direction offsets. The gaze direction offset is one example of eye data frequently used in the field of eye-tracking and provides a simple and reliable way of comparing acquired and stored eye data.

In a further preferred embodiment, the method further comprises acquiring the gaze direction offset for both eyes. Using data from both eyes of the user increases the precision and reliability of the method in determining a suitable calibration setting.

In an advantageous embodiment, the step of comparing comprises determining a relation between the gaze direction offsets of the left eye and the right eye and comparing the determined relation with a corresponding relation between stored gaze direction offsets of the left eye and the right eye. Preferably, the relation between the gaze direction offsets of the left eye and the right eye comprises the distance from the gaze direction offsets of the left eye and the right eye to the reference point, respectively, and/or the angle between the gaze direction offsets of the left eye and the right eye. Using the relation between the gaze direction offsets of the left eye and the right eye provides an additional basis for comparison which further improves the precision and reliability of the method in determining a viable calibration setting.

In an alternative embodiment, the step of acquiring eye data comprises determining one of an interocular distance (IOD) and an inter-pupillary distance (IPD), and the step of comparing eye data comprises comparing the acquired IOD or IPD with stored IODs or IPDs. Using data related to the distance between the eyes is further increases the precision and reliability of the method in determining a suitable calibration setting. Additionally, by combining different eye data in two or more steps, a first comparison may exclude non-viable calibrations to reduce the number of comparisons in subsequent steps, thereby achieving a faster calibration process.

In a second aspect of the present invention, there is provided an eye-tracking device operable for tracking a gaze direction of a user, wherein a calibration setting of the eye-tracking device associated with a user is calculated based on acquired eye data of the user when looking at a set of reference points, the device comprising at least one camera; processing circuitry; and a memory, said memory containing instructions executable by said processing circuitry, whereby said eye-tracking device is operative for: displaying a reference point of the set to the user; acquiring, by means of the camera, data for at least one of the eyes of the user when looking at the reference point; comparing the acquired eye data to stored eye data sets related to the reference point, wherein each of the stored eye data sets is associated with a calibration setting of the eye-tracking device; and if the acquired eye data matches one of the stored eye data sets, abandoning the calibration process and loading the calibration setting associated with the matching stored eye data.

In a preferred embodiment, the eye-tracking is further operative for, if the acquired eye data does not match any of the stored eye data sets, repeating the steps of displaying reference points and acquiring eye data for the remaining reference points in the set, calculating a calibration setting based on the acquired eye data for all the reference points in the set and storing the calculated calibration setting and the acquired eye data for all the reference points in the set.

In an alternative embodiment, a match is determined if the difference between the acquired eye data and the stored eye data does not exceed a predetermined threshold value.

In an advantageous embodiment, the eye-tracking device is further operative for determining a gaze direction offset between a gaze direction of at least one of the eyes of the user and the reference point; and comparing the acquired gaze direction offset with stored gaze direction offsets.

In an alternative embodiment, the eye-tracking device is further operative for acquiring the gaze direction offset for both eyes.

In a preferred embodiment, the eye-tracking device is further operative for determining a relation between the gaze direction offsets of the left eye and the right eye and comparing the determined relation with a corresponding relation between stored gaze direction offsets of the left eye and the right eye. Preferably the relation between the gaze direction offsets of the left eye and the right eye comprises the distance from the gaze direction offsets of the left eye and the right eye to the reference point, respectively, and/or the angle between the gaze direction offset of the left eye and the right eye.

In an advantageous embodiment, the eye-tracking device is further operative for determining one of an interocular distance (IOD) and an inter-pupillary distance (IPD), and comparing the acquired IOD or IPD with stored IODs or IPDs.

In a third aspect of the present invention, there is provided a computer program comprising computer readable code means to be run in an eye-tracking device for tracking a gaze direction of a user, wherein a calibration setting of the eye-tracking device associated with a user is calculated based on acquired eye data of the user when looking at a set of reference points, which computer readable code means when run in the eye-tracking device causes the eye-tracking device to perform the following steps: displaying a reference point of the set to the user; acquiring, by means of at least one camera of the eye-tracking device, eye data for at least one of the eyes of the user when looking at the reference point; comparing the acquired eye data to stored eye data sets related to the reference point, wherein each of the stored eye data sets is associated with a calibration setting of the eye-tracking device; and if the acquired eye data matches one of the stored eye data sets, abandoning the calibration process and loading the calibration setting associated with the matching stored eye data.

In a fourth aspect of the present invention, there is provided a carrier containing the computer program according to the third aspect, wherein the carrier is one of an electronic signal, optical signal, radio signal or computer readable storage medium.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a method for calibrating an eye-tracking device to suit a user of the eye-tracking device, is provided, reduces the time spent in the calibration process of an eye-tracking device to improve the eye-tracking experience of the user. By using methods, devices and computer programs according to the present disclosure, the experience of eye-tracking for the user can be improved by enabling fast calibration to a pre-existing calibration setting of the eye-tracking device.

Figure 1A:
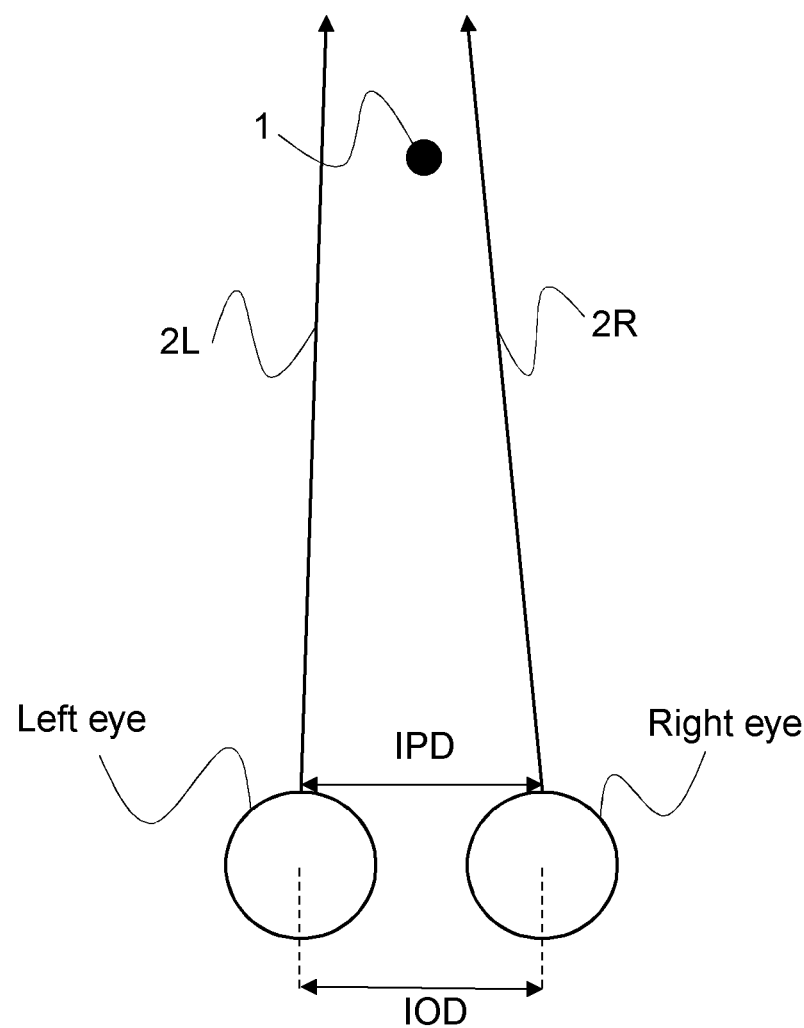
FIG. 1a is a top view in a horizontal plane illustrating a gaze direction of a user in relation to a reference point.

FIG. 1a illustrates the gaze direction of a user when looking at a reference point 1 generated and displayed by an eye-tracking device. FIG. 1 is a top view in a horizontal plane, parallel to a transverse or axial plane of the user. As may be seen, the gaze direction of each eye of the user, illustrated by the arrows 2L and 2R, does not coincide with the reference point 1 but is rather offset in relation to the reference point 1. The offset of the gaze direction, usually termed gaze direction offset, is determined by performing a ray vs plane intersection test. More specifically, the intersection between the ray defined by the gaze direction 2L, 2R of the respective eye and a vertical plane substantially perpendicular to the user and containing the reference point 1.

Also in FIG. 1a, an illustration of the interocular distance (IOD) and the interpupillary distance (IPD) is provided. The interocular distance is defined as the distance between the center of the left eye and the center of the right eye of the user and is substantially a constant, fixed value independent of the movement of the eyes. On the other hand, the interpupillary distance is defined as the distance between the centers of the pupil of the left eye and the pupil of the right eye of the user and may vary as the user moves the eyes when looking at different objects, e.g. near objects or far away, or objects to the left or to the right of the user.

Figure 1B:
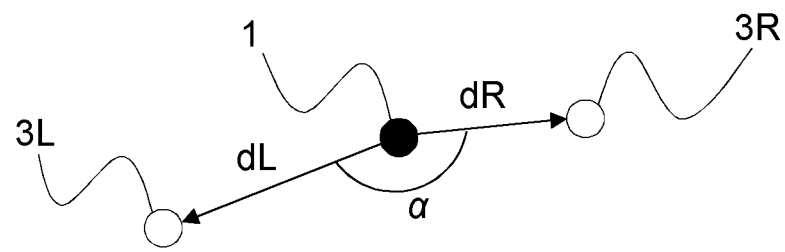
FIG. 1b is a view in a vertical intersection plane illustrating a gaze direction offset of a user in relation to a reference point.

In FIG. 1b, the vertical intersection plane containing the reference point 1 is illustrated. As may be seen, the points of intersection 3L and 3R corresponding to the gaze direction offsets 3L, 3R of the left eye and the right eye, respectively, are separated from the reference point 1 by distances dL and dR, respectively, and present different angular orientations with respect to the reference point. The angle α between the gaze direction offsets 3L, 3R of the left eye and the right eye, respectively, with the reference point 1 defining the origin, is also illustrated in FIG. 1b.

The eye tracker may have default parameters to start with. Default calibration creates a semi-unique pattern of eye data per user. The unique pattern created when using default calibration can be stored together with a performed calibration and compared against if the user looks at the same reference points again. Hence, when the same user initiates the eye-tracking device at a later time, the calibration process according to the present invention will only require the user to look at one reference point in order to determine a match with the user's previously stored calibration setting. However, the calibration process may also be used to quickly load a suitable calibration setting for a new user.

The invention proposed matches eye data against other existing eye data to try and see if there is a similar calibration available. In embodiments, this is achieved by comparing the user's gaze direction offset, interocular distance IOD and/or interpupillary distance IPD as defined above to corresponding stored gaze direction offsets, IODs and/or IPDs.

Figure 2A:
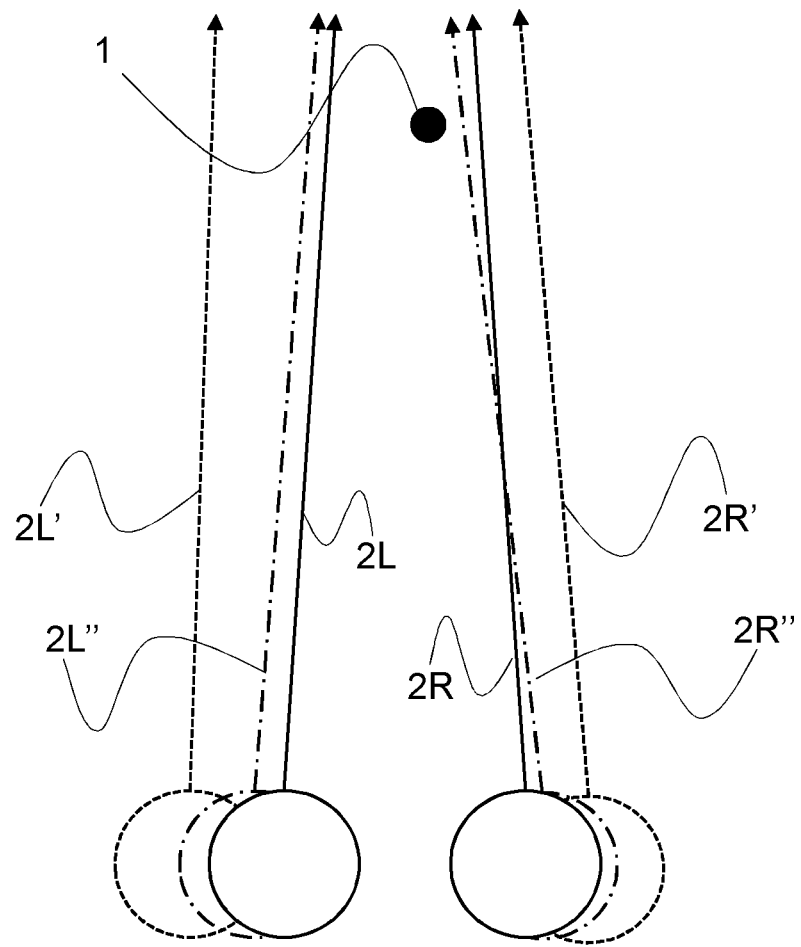
FIG. 2a is a top view in a horizontal plane illustrating a gaze direction of a user in relation to a reference point compared to stored gaze directions of other users.

FIG. 2a illustrates in a top view similar to FIG. 1a, a situation with pre-existing calibration settings associated with stored eye data of first and second prior users. The first prior user is illustrated using dashed lines and the second prior user with dot-dashed lines. The current user is illustrated using solid lines. As may be seen the gaze direction 2L, 2R in relation to reference point 1 of the current user differs significantly from the gaze direction 2L', 2R' of the first prior user but corresponds to a high degree to the gaze direction 2L", 2R" of the second prior user. Hence, it appears that a stored calibration setting associated with the second prior user would provide a good match for the current user.

Figure 2B:
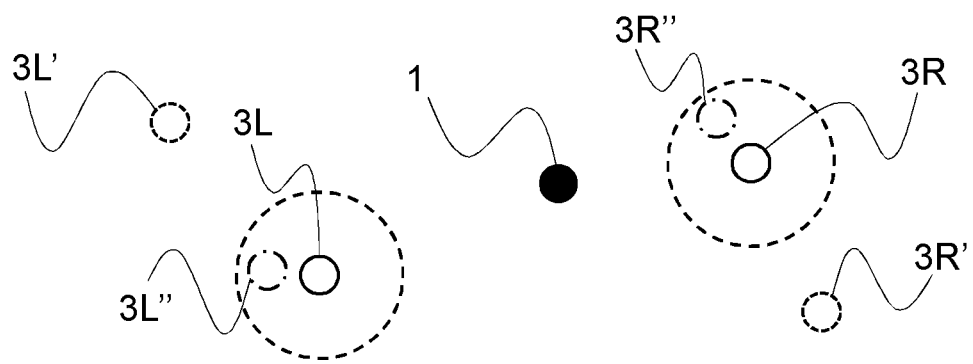
FIG. 2b is a view in a vertical intersection plane of a gaze direction offset of a user in relation to a reference point compared to stored gaze direction offsets of other users.

Turning now to FIG. 2b, the gaze direction offsets 3L, 3R of the left eye and the right, respectively, of the current user are shown as points on the vertical plane together with the stored gaze direction offsets 3L', 3R'; 3L", 3R" of the first and second prior users. When comparing the gaze direction offsets, the corresponding points on the plane are compared and if the distance between them is within a certain amount it is considered a viable calibration. As already discussed above in relation to FIG. 2a, the gaze direction offsets 3L, 3R of the current user differ significantly from the gaze directions offsets 3L', 3R' of the first prior user, whereas they correspond closely with the gaze directions offsets 3L", 3R" of the second prior user. A dashed circle centered on each of the gaze direction offsets 3L, 3R of the current user is shown representing a threshold value for the comparison between the gaze direction offsets. As the gaze direction offsets 3L", 3R" of the second prior user each lies within the threshold represented by the respective dashed circle centered on the gaze direction offsets 3L, 3R of the current user, they provide a match in the context of the present invention. In a situation where several stored gaze direction offsets provide a match, i.e. lie within the dashed circle representing the threshold, the gaze direction offset with the smallest difference is selected. This may be achieved e.g. by successively decreasing the threshold (decreasing the radius of the dashed circle) until only one single stored gaze direction offset matches the acquired gaze direction offset 3L, 3R of the current user.

Figure 3:
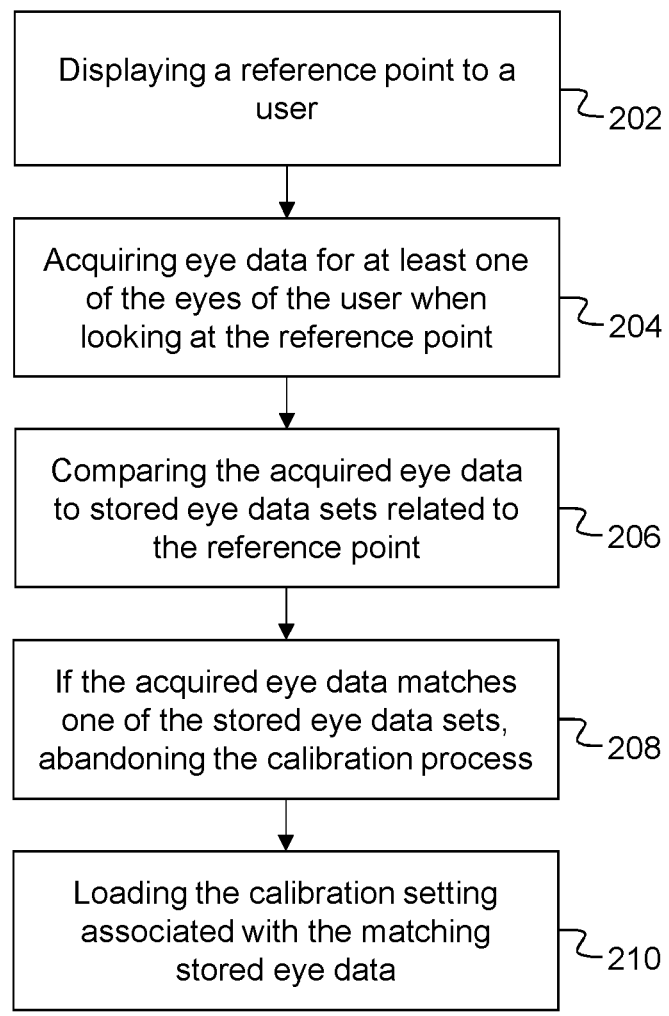
FIG. 3 is a flowchart schematically showing method steps of an embodiment of a method according to the present disclosure.

FIG. 3, in conjunction with FIGS. 1 and 2, shows an embodiment of a method for calibrating an eye-tracking device 600, wherein the eye-tracking device 600 comprises at least one camera 10. A calibration setting of the eye-tracking device 600 associated with a user is calculated based on acquired eye data of the user when looking at a set of reference points 1. The method may in some embodiments be performed by the eye-tracking device 600, and in some embodiments, the method may be performed elsewhere using data obtained from the eye-tracking device 600, for example in a cloud environment to which the eye-tracking device 600 is operatively connected.

The method comprises displaying 202 a reference point 1 of the set to the user. The method further comprises acquiring 204 eye data for at least one of the eyes of the user when looking at the reference point 1. The method further comprises comparing 206 the acquired eye data to stored eye data sets related to the reference point 1, wherein each of the stored eye data sets is associated with a calibration setting of the eye-tracking device. The method further comprises, if the acquired eye data matches one of the stored eye data sets, abandoning 208 the calibration process and loading 210 the calibration setting associated with the matching stored eye data.

In some embodiments, the step of acquiring 204 eye data comprises determining a gaze direction offset 3L, 3R between a gaze direction 2L, 2R of at least one of the eyes of the user and the reference point 1, and the step of comparing 206 eye data comprises comparing the acquired gaze direction offset 3L, 3R with stored gaze direction offsets 3L', 3R'; 3L", 3R".

In some embodiments, the step of acquiring 204 eye data comprises determining one of an interocular distance (IOD) and an interpupillary distance (IPD) of the user, and the step of comparing 206 eye data comprises comparing the acquired IOD or IPD with stored IODs or IPDs.

The acquired eye data may, of course, include other relevant values and measurements related to the user and may be combined and compared in various ways and any order. For instance, the IOD and/or IPD may be used in a first comparison to exclude stored IODs and/or IPDs which do not match and then a second comparison may be performed using the acquired gaze direction offsets 3L, 3R to find the most closely matching stored gaze direction offsets 3L', 3R'; 3L", 3R". Alternatively, the gaze direction offsets may be compared before the IODs and/or IPDs.

In some embodiments, a match is determined if the difference between the acquired eye data and the stored eye data does not exceed a predetermined threshold value.

Figure 4:
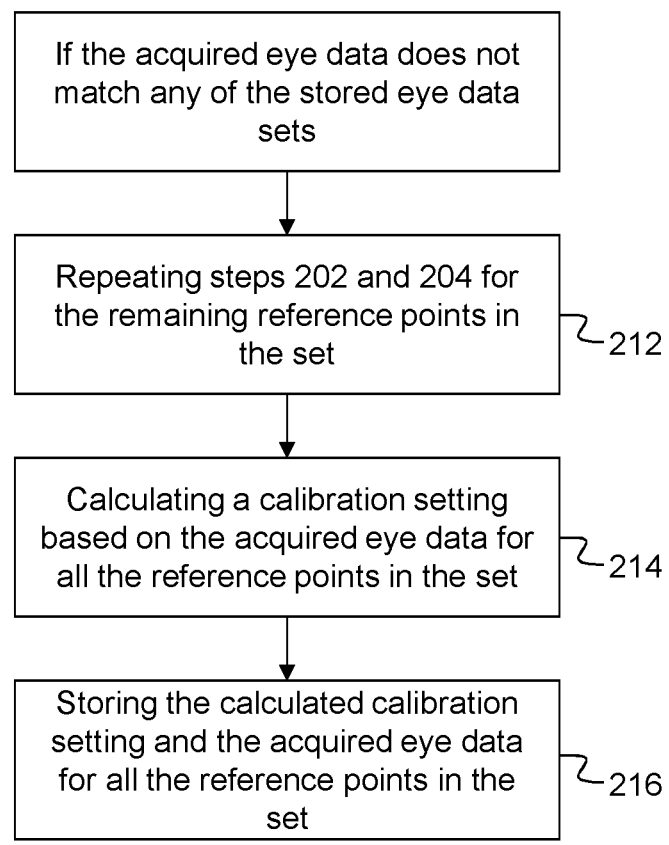
FIG. 4 is a flowchart schematically showing method steps of a further embodiment of a method according to the present disclosure.

FIG. 4, in conjunction with FIGS. 1 and 2, shows a further embodiment of a method for calibrating an eye-tracking device 600 in the case wherein the acquired eye data does not match any of the stored eye data sets. The method further comprises repeating 212 steps 202 and 204 for the remaining reference points in the set. The method further comprises calculating 214 a calibration setting based on the acquired eye data for all the reference points in the set. The method further comprises storing 216 the calculated calibration setting and the acquired eye data for all the reference points in the set.

Figure 5:
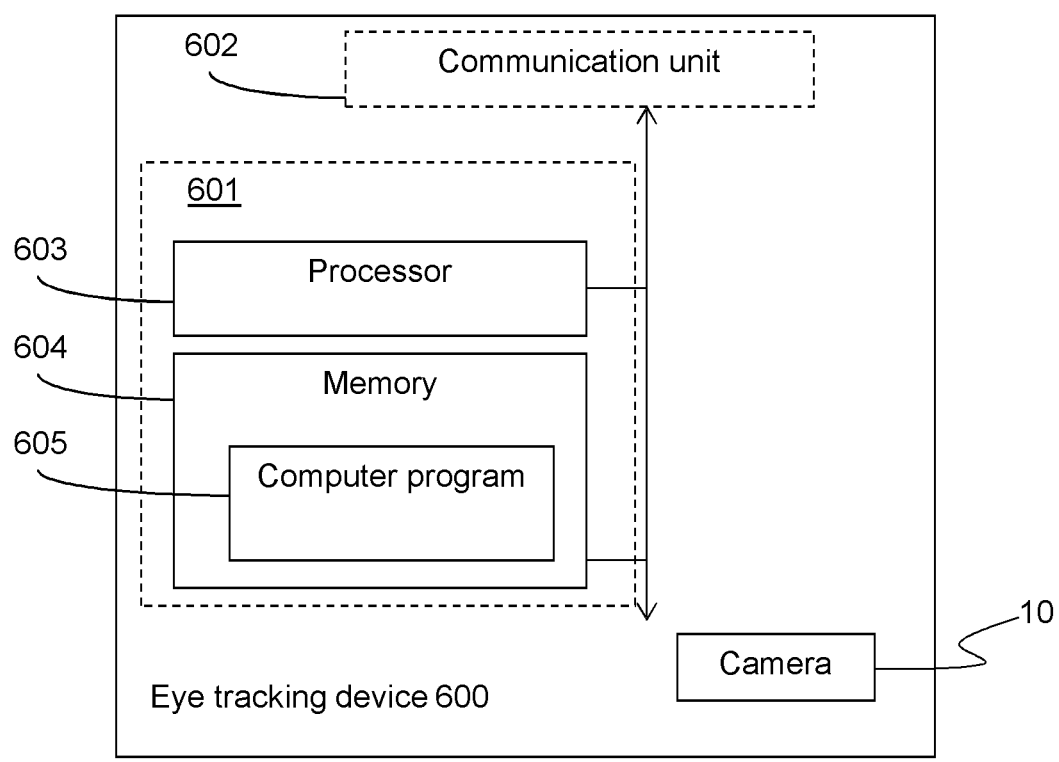
FIG. 5 shows a block schematic of an eye-tracking device according to an embodiment.

FIG. 5, in conjunction with FIG. 1, shows an eye-tracking device 600, capable of tracking the eyes of a user. The eye-tracking device 600 comprises processing circuitry 603 and a memory 604. The processing circuitry 603 may comprise one or more programmable processors, application-specific integrated circuits, field programmable gate arrays or combinations of these (not shown) adapted to execute instructions. The memory contains instructions executable by said processing circuitry, whereby the eye-tracking device 600 is operative for displaying a reference point 1 of the set to the user. The eye-tracking device 600 is further operative for acquiring eye data for at least one of the eyes of the user when looking at the reference point 1. The eye-tracking device 600 is further operative for comparing the acquired eye data to stored eye data sets related to the reference point, wherein each of the stored eye data sets is associated with a calibration setting of the eye-tracking device 600. The eye-tracking device 600 is further operative for if the acquired eye data matches one of the stored eye data sets, abandoning the calibration process and loading the calibration setting associated with the matching stored eye data.

According to an embodiment, the eye-tracking device 600 is further operative for, if the acquired eye data does not match any of the stored eye data sets, repeating the steps of displaying a reference point and acquiring eye data for the remaining reference points in the set, calculating a calibration setting based on the acquired eye data for all the reference points in the set and storing the calculated calibration setting and the acquired eye data for all the reference points in the set.

According to an embodiment, a match is determined if the difference between the acquired eye data and the stored eye data does not exceed a predetermined threshold value According to an embodiment, the eye-tracking device 600 is further operative for determining a gaze direction offset between a gaze direction of at least one of the eyes of the user and the reference point; and comparing the acquired gaze direction offset with stored gaze direction offsets.

According to an embodiment, the eye-tracking device 600 is further operative for acquiring the gaze direction offset for both eyes.

According to an embodiment, the eye-tracking device 600 is further operative for determining a relation between the gaze direction offsets of the left eye and the right eye and comparing the determined relation with a corresponding relation between stored gaze direction offsets of the left eye and the right eye. According to an embodiment, the relation between the gaze direction offsets of the left eye and the right eye comprises the distance dL, dR from the gaze direction offsets of the left eye and the right eye to the reference point, respectively, and/or the angle α between the gaze direction offset of the left eye and the right eye.

As discussed above in conjunction with FIG. 1*b*, the distances dL, dR and/or the angle α may be used to further establish a closest fit between the current user and stored calibration settings. This may be carried out in several steps wherein after identifying a number of suitable stored calibration settings by comparing the acquired gaze direction offsets 3L, 3R with the stored gaze direction offsets 3L', 3R'; 3L", 3R", the relation between the gaze direction offsets (distance dL, dR and/or angle α) may be used to further differentiate between the candidates of suitable stored calibration settings to find the optimal one, i.e. the one with the smallest difference in comparison with the acquired eye data of the current user.

According to an embodiment, the eye-tracking device 600 is further operative for determining one of an interocular distance (IOD) and an inter-pupillary distance (IPD); and comparing the acquired IOD or IPD with stored IODs or IPDs.

In some embodiments, the feature(s) of the eye-tracking device 600, e.g. the processing circuitry 603 and the memory 604, which perform the method steps may be a group of network nodes, wherein functionality for performing the method are spread out over different physical, or virtual, nodes of the network. In other words, the feature(s) of the eye-tracking device 600 which perform the method steps may be a cloud-solution, i.e. the feature(s) of the eye-tracking device 600 which perform the method steps may be deployed as cloud computing resources that may be distributed in the network.

According to other embodiments, the eye-tracking device 600 may further comprise a communication unit 602, which may be considered to comprise conventional means for communicating with relevant entities, such as other computers or devices to which it is operatively connected. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a microprocessor and adequate software and storage therefor, a Programmable Logic Device, PLD, or other electronic component(s)/processing circuit(s) configured to perform the methods mentioned above.

The computer program 605 may comprise computer readable code means, which when run in an eye-tracking device 600 causes the eye-tracking device 600 to perform the steps described in any of the described embodiments of the eye-tracking device 600. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the eye-tracking device 600, to which the eye-tracking device 600 has access via the communication unit 602. The computer program may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art and that the scope of the presently described concept is accordingly not to be limited. Reference to an element in the singular is not intended to mean "one and only one"

unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for calibrating an eye-tracking device to suit a user of the eye-tracking device, wherein a calibration setting of the eye-tracking device associated with a user is calculated based on acquired eye data of the user when looking at a set of reference points, the method comprising the steps of:
displaying a reference point of the set to the user;
acquiring, by means of at least one camera of the eye-tracking device, and by determining a gaze direction offset between a gaze direction of at least one of the eyes of the user and the reference point, eye data for at least one of the eyes of the user when looking at the reference point;
comparing the acquired eye data to stored eye data sets related to the reference point, by comparing the acquired gaze direction offset with stored gaze direction offsets, and wherein each of the stored eye data sets is associated with a calibration setting of the eye-tracking device;
if the acquired eye data matches one of the stored eye data sets, loading the calibration setting associated with the matching stored eye data; and
if the acquired eye data does not match any of the stored eye data sets
repeating steps and for the remaining reference points in the set;
calculating a calibration setting based on the acquired eye data for all the reference points in the set; and
storing the calculated calibration setting and the acquired eye data for all the reference points in the set.

2. The method according to claim 1, wherein a match is determined if the difference between the acquired eye data and the stored eye data does not exceed a predetermined threshold value.

3. The method according to claim 1, further comprising acquiring the gaze direction offset for both eyes.

4. The method according to claim 3, wherein comparing the acquired gaze direction offsets comprises determining a relation between the gaze direction offsets of the left eye and the right eye and comparing the determined relation with a corresponding relation between stored gaze direction offsets of the left eye and the right eye.

5. The method according to claim 4, wherein the relation between the gaze direction offsets of the left eye and the right eye comprises the distance from the gaze direction offsets of the left eye and the right eye to the reference point, respectively, and/or the angle between the gaze direction offsets of the left eye and the right eye.

6. The method according to claim 1, wherein acquiring eye data comprises determining one of an interocular distance (IOD) and an interpupillary distance (IPD) of the user, and comparing eye data comprises comparing the acquired IOD or IPD with stored IODs or IPDs.

7. An eye-tracking device operable for tracking a gaze direction of a user, wherein a calibration setting of the eye-tracking device associated with a user is calculated based on acquired eye data of the user when looking at a set of reference points, the device comprising:
at least one camera;
processing circuitry; and
a memory, said memory containing instructions executable by said processing circuitry, whereby said eye-tracking device is operative for:
displaying a reference point of the set to the user;
acquiring, by means of at least one camera of the eye-tracking device, and by determining a gaze direction offset between a gaze direction of at least one of the eyes of the user and the reference point, eye data for at least one of the eyes of the user when looking at the reference point;
comparing the acquired eye data to stored eye data sets related to the reference point, by comparing the acquired gaze direction offset with stored gaze direction offsets, and wherein each of the stored eye data sets is associated with a calibration setting of the eye-tracking device;
if the acquired eye data matches one of the stored eye data sets, loading the calibration setting associated with the matching stored eye data; and
if the acquired eye data does not match any of the stored eye data sets
repeating steps and for the remaining reference points in the set;
calculating a calibration setting based on the acquired eye data for all the reference points in the set; and
storing the calculated calibration setting and the acquired eye data for all the reference points in the set.

8. The eye-tracking device according to claim 7, wherein a match is determined if the difference between the acquired eye data and the stored eye data does not exceed a predetermined threshold value.

9. The eye-tracking device according to claim 7, further comprising acquiring the gaze direction offset for both eyes.

10. The eye-tracking device according to claim 9, wherein comparing the acquired gaze direction offsets comprises determining a relation between the gaze direction offsets of the left eye and the right eye and comparing the determined relation with a corresponding relation between stored gaze direction offsets of the left eye and the right eye.

11. The eye-tracking device according to claim 10, wherein the relation between the gaze direction offsets of the left eye and the right eye comprises the distance from the gaze direction offsets of the left eye and the right eye to the reference point, respectively, and/or the angle between the gaze direction offsets of the left eye and the right eye.

12. The eye-tracking device according to claim 7, wherein acquiring eye data comprises determining one of an interocular distance (IOD) and an interpupillary distance (IPD) of the user, and comparing eye data comprises comparing the acquired IOD or IPD with stored IODs or IPDs.

13. A non-transitory computer readable medium storing instructions that, upon execution by an eye tracking device configured for tracking a gaze direction of a user, and having a calibration setting of the eye-tracking device associated with a user that is calculated based on acquired eye data of the user when looking at a set of reference points, cause the eye tracking device to perform operations comprising:
displaying a reference point of the set to the user;
acquiring, by means of at least one camera of the eye-tracking device, and by determining a gaze direction offset between a gaze direction of at least one of the eyes of the user and the reference point, eye data for at least one of the eyes of the user when looking at the reference point;

comparing the acquired eye data to stored eye data sets related to the reference point, by comparing the acquired gaze direction offset with stored gaze direction offsets, and wherein each of the stored eye data sets is associated with a calibration setting of the eye-tracking device;

if the acquired eye data matches one of the stored eye data sets, loading the calibration setting associated with the matching stored eye data; and if the acquired eye data does not match any of the stored eye data sets
- repeating steps and for the remaining reference points in the set;
- calculating a calibration setting based on the acquired eye data for all the reference points in the set; and storing the calculated calibration setting and the acquired eye data for all the reference points in the set.

* * * * *